Patented Mar. 1, 1938

2,109,466

UNITED STATES PATENT OFFICE 2,109,466

SYNTHETIC RESINS

Leon E. Champer, Vermilion, Ill., and Leo M. Christensen, Ames, Iowa, assignors, by mesne assignments, to The Chemical Foundation, Incorporated, New York, N. Y., a corporation of Delaware No Drawing. Application October 17, 1934, Serial No. 748,591

4 Claims. (Cl. 260—2)

This invention relates to a process of producing synthetic resins and to novel resinoid products.

The development of the use of synthetic resins of the phenol methylene type, although extensive, to no inconsiderable degree has been retarded by the relatively high cost of the starting materials. It is recognized by those skilled in the art that if the cost of synthetic resins could be brought down to approximately that of less serviceable materials employed in mechanical arts, the field of use could be greatly extended.

The recent developments in this art have been motivated by this desire and the novel synthetic resins proposed have largely comprised less expensive substitutes for one of the reactants, usually formaldehyde. Among others, it has heretofore been suggested to produce a thermosetting plastic by reacting phenol with a carbohydrate material, such as cellulose. Such a plastic has been described in United States Patent 1,886,353.

As a result of considerable experimentation we have found that a novel type of resin, possessing properties superior to any analogous prior art product, may be prepared by reacting cellulosic-ligneous materials with phenol or a homologue thereof under definitely controlled conditions of temperature and concentration of the catalyst or condensing agent. As will appear more fully hereinafter, the new product, in contradistinction to prior materials of the same type, possesses such improved mechanical and chemical properties as to render it an excellent material for use in the plastic arts.

It is, therefore, an object of the present invention to produce a new synthetic resin.

Another object is to prepare a fusible or soluble condensation product of cellulosic material and a phenolic body.

A further object is to produce a thermo-setting reaction product of cellulosic-ligneous material and a phenolic body.

A still further object is to produce a potentially reactive condensation product which, by application of heat and pressure, may be transformed to a solid infusible and insoluble resinoid, characterized by excellent mechanical, chemical and electrical properties.

Yet a further object is to produce a new composition of matter comprising an intermediate and/or ultimate reaction product of cellulosic material and phenol or a homologue thereof.

With these and other equally important objects in view the invention comprises the production of a resinous condensation product by reacting phenol or a homologue with material containing cellulose, lignin, and pentosans, under definitely controlled thermal conditions and in the presence of definite amounts of a catalyst. The initial product thus obtained is fusible, soluble in alcohols, ketones, alkalies and esters, and may be transformed, by the application of heat and pressure, to an infusible, insoluble product characterized by a high alkali and acid resistance and good dielectric strength. A striking property of the product is its resistance to hydrolysis.

As intimated hereinbefore, it has already been proposed to prepare a synthetic resin utilizing cellulose or cellulosic materials and phenol as the reactants. In such prior proposals approximately 200 parts of anhydrous phenol containing 5 parts of 50% sulphuric acid were added to 100 parts of cellulosic material. The materials were then heated to a temperature above the boiling point of any of the constituents, the preferable temperature range being between 177° C. and 232° C., and pressures up to 100 lbs. per sq. in. Such prior methods also indicated the advisability of utilizing a hardening agent (furfural) to transform the resin to the C stage. The conditions of such prior methods were, therefore, a high concentration of acid (1.25 parts of concentrated acid per 100 parts of phenol by weight), and a high reaction temperature.

This type of prior product, however, has not found any considerable use in industry due primarily to the fact that it was deficient in mechanical strength, was not sufficiently resistant to water and decomposed badly during the thermo-setting operation. The conditions of the present process on the other hand are markedly different and it is found that this difference is not, as might first appear, merely one of degree, for the product produced is of improved properties as will be seen more fully hereinafter, particularly in respect of its resistance to hydrolysis, mechanical strength and resistance to thermal decomposition.

In carrying out the process any readily available and cheap cellulosic or cellulose-ligneous material may be utilized. Thus the process operates successfully, and improved results are secured, by employing such materials as wood wastes, cereal straw, corn cobs, news print and the like. Similarly, in lieu of phenol, homologues such as cresol, resorcinol and the like, may be employed. The thermal conditions and the concentration of the catalyst must, however, be carefully regulated or controlled in order to secure a product of the improved properties described. The product produced by the present method is chemically and physically unlike prior art resins made from similar materials.

The main features of the process are illustrated in the following example:

Example

To 1000 grams of phenol there was added 0.3 gram of concentrated sulphuric acid. The mixture was admitted to a steam-jacketed reaction vessel and the temperature raised to between 130–135° C. 500 grams of newsprint was then added as rapidly as solution occurred. This required approximately fifteen minutes and a vigorous evolution of water vapor obtained. Upon the dissolution of the newsprint the mixture became black. After addition and dissolution the reaction vessel was sealed and was then connected with a condenser and vacuum pump. The temperature of the mass was gradually raised to approximately 160° C. and this temperature maintained until all the excess phenol had distilled over and was recovered along with the water formed as a result of the condensation reaction. The total time of the reaction under these conditions was approximately three hours.

It was found that the distillate comprised 490 grams of phenol and 90 grams of water.

The molten plastic was poured from the reaction vessel into pans and allowed to cool and solidify. This product weighed 920 grams; it was of a dark brown color, fusible and was found to be completely soluble in alcohol, ketones and esters. Upon testing it was found that the product plasticized or softened at from 60 to 70° C.; melted at 110 to 120° C. and did not decompose below 200° C.

The fusible form of the resin as prepared above was then ground and mixed with from 1 to 1½ parts of wood flour and a small quantity of a pigment. The mixture was milled for about 5 minutes at a temperature of from 110 to 120° C., i. e. while in the liquid state.

The milled material was then allowed to cool, was ground and then molded at a temperature of approximately 160° C. and under a pressure of about 2 tons per sq. in. The final infusible product possessed a high tensile and dielectric strength and was characterized by a striking resistance to hydrolysis. Samples of the product maintained in boiling water for a period of fifteen plus hours showed no hydrolysis whatever.

It will be appreciated that in operating under the principles of the present invention, deviations from the described disclosure may be made without departing from the scope of the invention. Thus in some circumstances, for the preparation of the molded product it is desirable to add sufficient lime to neutralize any residual sulphuric acid. In many circumstances, however, it is found that this is not necessary. Again it will be understood that instead of mixing the fusible form of the novel resin with a filler and then proceeding with the milling step, the product may be dissolved in a suitable solvent, such as ethyl alcohol, the filler stirred in and the alcohol then evaporated. It is found however that this procedure is not as satisfactory as milling.

As indicated above, it has been found that the factors of acid (catalyst) concentration and temperature are of salient, if not critical, importance. Thus it has been found that a resin possessing the optimum properties described can be secured only when the concentration of the acid is limited to a definite range. Similarly, such acid concentration must be carefully correlated with the final reaction temperature. Thus the improved products described may be secured when the sulphuric acid concentration is maintained between 0.01 to 0.1 gram per 100 grams of phenol, and the final reaction temperature does not exceed 165° C. In these circumstances the water of condensation does not substantially exceed 20 grams per 100 grams of cellulosic material or 10 grams per 100 grams of plastic, and in the typical case is about ninety percent of these values.

If, on the other hand, these precautions are not observed, that is to say if acid concentrations greater than those stated are employed, it appears the condensation reaction proceeds further and the resultant product is markedly different from that described here. These differences are accentuated when, in addition to high acid concentrations, high temperatures are utilized. Operating at such high concentration and temperature a product is obtained in a low yield and the final infusible modification presents a much lower decomposition temperature than the novel product, and furthermore is seriously hydrolyzed in boiling water. A further striking difference is the fact that the product prepared with higher acid concentrations is not completely soluble in organic solvents.

It will thus be observed that the present method is markedly different from prior procedures in respect of quantity of the condensing agent employed and the thermal conditions utilized, and that by reason of such established condition a material modification in the character and/or degree of reaction obtains. By reason of the special conditions of the treatment products are secured which are in fact new, for they possess physical and chemical properties which strikingly differentiate them from similar products heretofore produced.

It will be understood that the acid concentration noted above represents the preferred range. Thus when amounts of sulphuric acid less than 0.01 gram (per 100 grams of phenol) are employed a satisfactory product may be secured but the reaction proceeds very slowly. If amounts greater than 0.1 gram (per 100 grams of phenol) are used, the reaction is quite rapid but the product is quite unlike that produced with the optimum acid concentrations and does not possess the improved properties described.

While no attempt is made to define the mechanism of the condensation reaction, it appears that such reaction in some manner involves the hydroxyl groups of the cellulosic or lignous material. It has been found, for example, that resin very similar to the cellulosic or lignous resin described herein may be produced, under the same conditions, from alcohols, such as the butyl alcohols and glycerol. These materials condense with phenol, under the stated conditions, to yield dark colored resins similar to those described.

It will be understood, of course, that if the raw materials employed are acidic or alkaline in character, the amount of the said catalyst employed should be adjusted accordingly.

As will have been appreciated, sulphuric acid constitutes the preferred catalyst. It has been found that hydrochloric acid, or materials yielding it, does not operate satisfactorily. On the other hand, phosphoric acid may be employed, although this acid is not as effective as sulphuric in producing the improved resins.

It is clearly to be understood that the novel synthetic resins, either in the fusible or infusible modification, may be employed in any circumstance where their properties are advantageous. Thus the final product may be employed in moulded form in the plastic arts. Again, as will be understood by those skilled in the art, laminated moulded products may be produced by impregnating woven or matted sheets of fibrous material, such as cotton, hemp, bagasse, asbestos and the like and then the impregnated material moulded under the temperature and pressure conditions stated.

Similarly, it will be appreciated that the principles set forth herein may be utilized to manufacture a wide range of composite products. Thus if a cellulosic resin of increased flexibility is desired it will be appreciated that the infusible form of the resin may homogeneously be incorporated with predetermined quantities of tung oil and polymerization of the oil effected concomitantly with the transformation of the resin to the final infusible form. Likewise novel resins may be obtained by cocondensing the phenol-cellulose (or lignin) resin with other resins, such as phenol formaldehyde, in any desired relative proportions of the cellulose and formaldehyde, within the stated temperature range. Again it will be understood that the improved resins herein may be combined with natural resins, such as colophony, by heating the colophony with the fusible modification of the synthetic resin until a homogeneous mixture is secured. Such a material dissolved in a suitable vehicle may be employed as a varnish.

The invention, therefore, is conceived to reside in the improved process described herein, together with the novel resins produced in whatever state and admixture and/or combination.

We claim:

1. The process for the production of a synthetic resin which comprises, reacting cellulose with phenol at a temperature between about 130° C. and 165° C., in the presence of effective amounts of and not more than about 0.1 per cent. by weight, of an acid selected from the group consisting of sulphuric acid and phosphoric acid, based on the weight of the phenol.

2. The process for the production of a synthetic resin which comprises reacting cellulose with a phenol at a temperature between about 130° C. and about 165° C., in the presence of between about 0.1 per cent and about 0.01 per cent of sulphuric acid, based on the weight of the phenol employed.

3. The process for the production of synthetic resins, which comprises reacting a cellulose with phenol at a temperature of about 135° C. in the presence of between about 0.1 per cent and about 0.01 per cent by weight of sulphuric acid, based on the weight of phenol employed, and finishing the reaction mass at a temperature of about 160° C.

4. The process for the production of a synthetic resin which comprises, reacting a material selected from the group consisting of cellulose and ligneous materials with a phenol at a temperature between about 135° C. and 165° C., in presence of between 0.1 per cent. and about 0.01 per cent. of sulphuric acid, based on the weight of the phenol employed.

LEON E. CHAMPER.
LEO M. CHRISTENSEN.